May 24, 1927.
J. ARTER ET AL
1,629,902
POWER TRANSMITTING DEVICE
Filed Aug. 4, 1925
3 Sheets-Sheet 1
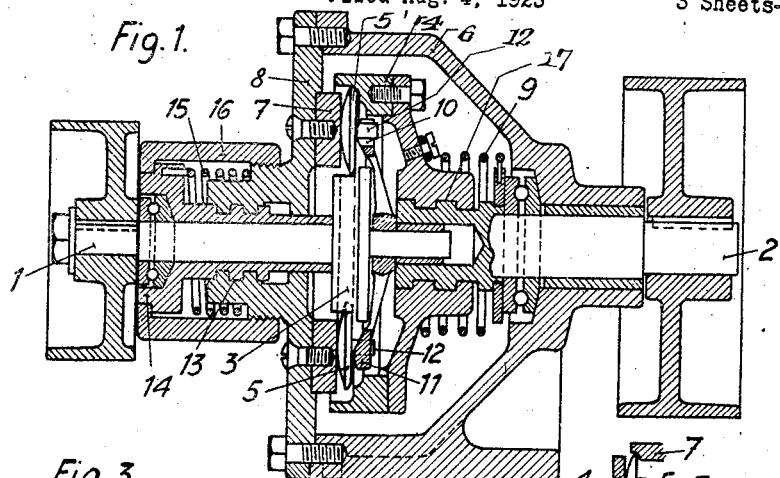
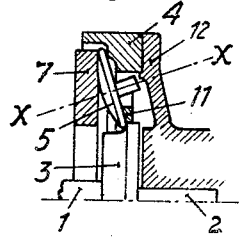
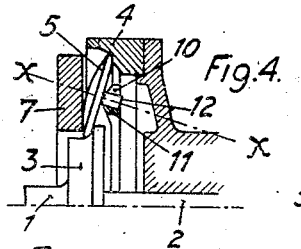
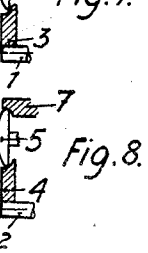
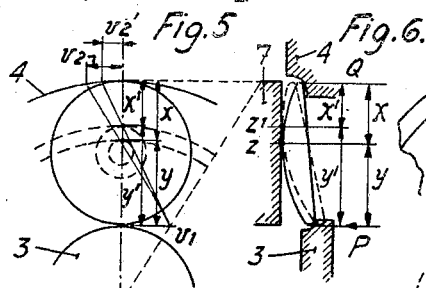
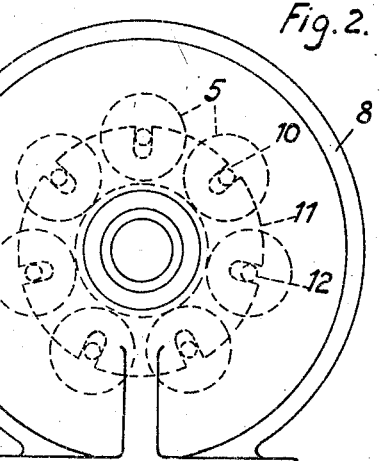
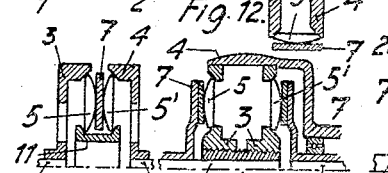

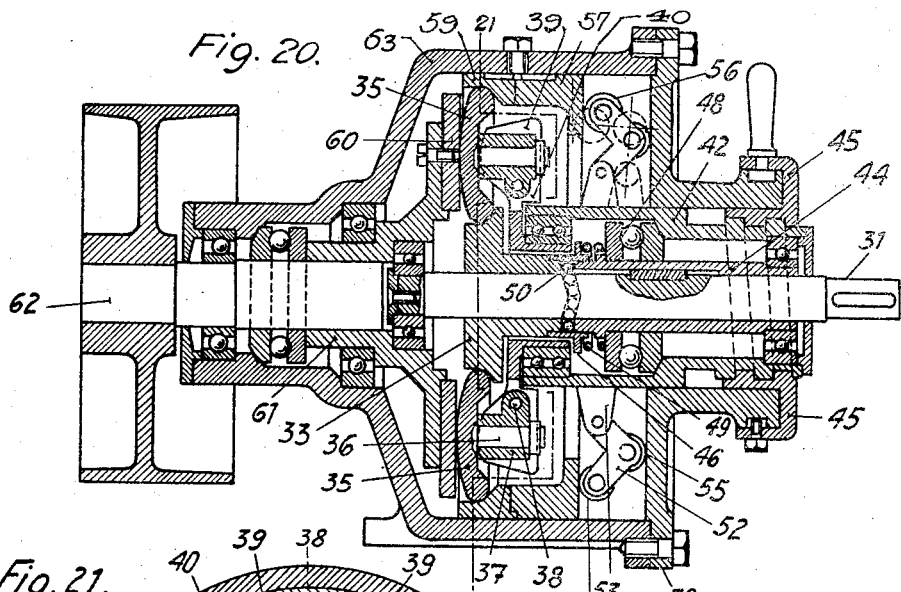
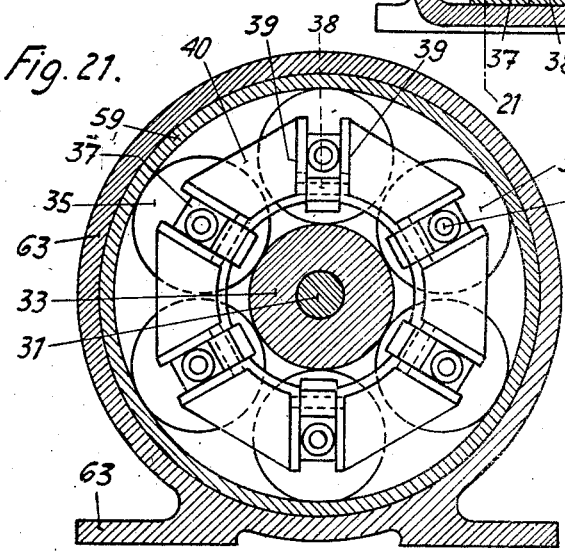
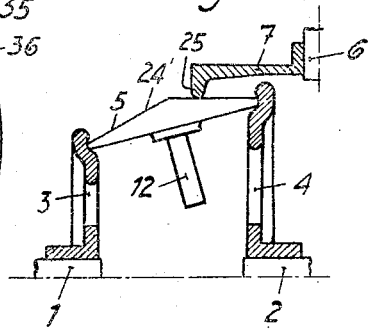
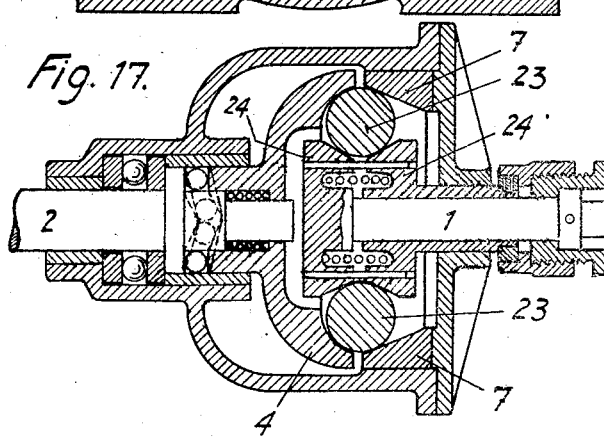
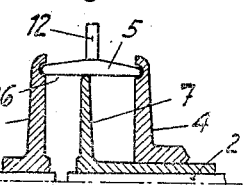

May 24, 1927.

J. ARTER ET AL 1,629,902

POWER TRANSMITTING DEVICE

Filed Aug. 4, 1925

Patented May 24, 1927.

1,629,902

UNITED STATES PATENT OFFICE.

JAKOB ARTER, OF OBERENGSTRINGEN, AND EDMUND SCHELLING, OF DIETIKON, SWITZERLAND.

POWER-TRANSMITTING DEVICE.

Application filed August 4, 1925, Serial No. 48,150, and in Germany August 7, 1924.

The invention relates to improvements in power transmitting gearing.

The main object of the invention is to provide a power transmitting gearing in which automatic variation of speed ratio between the driving member and the driven member is effected, the change in speed ratio being made responsive to any desired variable factor such for example as speed, torque etc. or it may be responsive to any combination of such factors. Suitable means are provided to effect the variation by hand.

More specifically the gearing comprises a form of friction gearing in which metallic disks, balls, cones or the like are placed between a driving element and a driven element said disks etc. rolling on an adjustable member, adapted to be held stationary.
By adjusting the stationary element with reference to the said rolling bodies transmitting the power from the driving element to the driven element the ratio of speed may be altered.

In the accompanying drawings some different forms of construction are shown some in a diagrammatical manner by way of examples.

Fig. 1 is a sectional elevation of a change speed gear,

Fig. 2 is a side view thereof,

Figs. 3 and 4 show co-operating parts of the device in different positions,

Figs. 5 and 6 illustrate the action of the power transmitting bodies,

Figs. 7 to 19 show in a diagrammatical manner by means of cross-sections through the most important parts of the device different shapes of those elements co-operating to transmit power from the driving shaft to the driven shaft.

Fig. 20 is a longitudinal section through a gearing in which the flat angular section is mounted on the driven part and not on the stationary part. Fig. 21 is the section on line 21—21 of Fig. 20.

Figure 22:
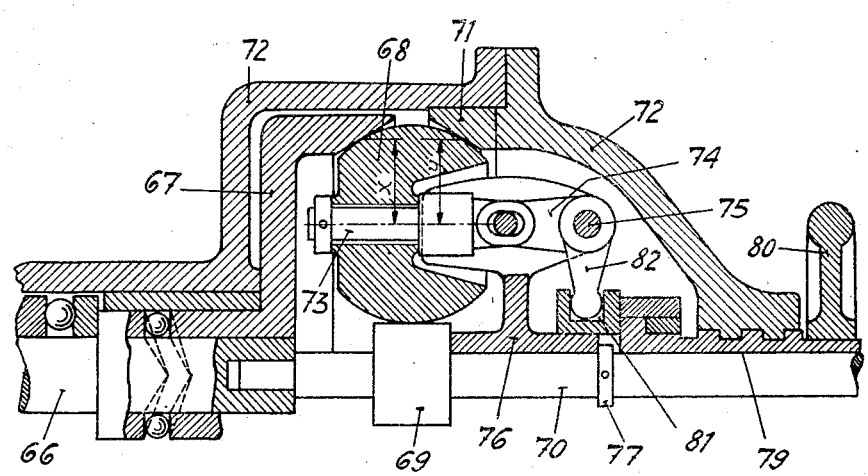
Fig. 22 is a longitudinal section through a gearing in which the roller elements are substantially spherical and are mounted on oscillable axes.

In the drawing Figs. 1 to 4, 1 denotes the driving shaft connected in a suitable manner to a suitable motor; 2 denotes the driven shaft arranged co-axially to shaft 1. On shaft 1 a wheel 3 is rigidly fixed, and on shaft 2 a wheel 4 is mounted movable in axial direction as described hereinafter. Between the wheels 3, 4 seven rotary disks 5 are arranged engaging frictionally wheel 3 and wheel 4. Each disk 5 is provided with a curved face which touches an annular race 7 rigidly fixed to a casing 6, 8. The casing 8 and therewith race 7 are held stationary while the device is working and the disks 5 which are pressed on to said race 7, are rotating about their axis. Within the casing 6 a coiled spring 9 is arranged surrounding shaft 2 and abutting with one end on a ball-bearing of casing 6 and with the other end on the wheel 4 which spring 9 presses the disks 5 on to the race 7. Each disk 5 is provided at its axis with a short cylindrical trunnion 12 engaging a radial slot 10 of an annular guide piece 11. The wheel 3 is movable in axial direction and to effect an axial displacement thereof a sleeve 14 is provided in which the shaft 1 is rotatably mounted. The sleeve 14 fits between the wheel 3 and a pulley keyed on to shaft 1 and bears on a ball bearing in such a manner that shaft 1 can freely turn in said sleeve 14 but follows any axial displacement which sleeve 14 will make. Sleeve 14 is provided with screw threads 13 of high pitch. Between a flange of sleeve 14 and cover 8 of the casing 6 a coiled spring 15 is arranged which tends to press sleeve 14 and therewith wheel 3 to the left (Fig. 1). On the casing 8 a screw-threaded ring 16 is arranged which engages with an inwardly projecting flange on the sleeve 14. By turning the ring 16 on casing 8 the end position of sleeve 14 and therewith the end or initial position of shaft 1 and wheel 3 may be adjusted. The wheel 4 is provided with a hub having internal screw threads 17 engaging threads of the driven shaft 2.

In the position of the parts shown in Fig. 1 the driving shaft 1 transmits its rotation by means of wheel 3 and disks 5 to wheel 4 and to the driven shaft 2. The geometrical axis of each disk 5 or its axis of rotation runs parallel to the shafts 1 and 2. The point in which each disk 5 touches race 7 is in the axis of rotation of the disk 5. As soon as the wheels 3 and 4 are moved in axial direction with reference to each other, if for instance wheel 4 is moved to the left and wheel 3 to the right to the position shown in Fig. 3 each disk 5 of the device is moved and its axis of rotation $x-x$ is oblique to the shafts 1, 2. The point $z$ (Fig. 6) at which the disk 5 touches race 7 is out of the centre and moves to $z'$ (Fig. 6). If shaft 1 is rotated all the disks 5 of the device rotate about their axes $x-x$ but as the point $z$ has moved to the position $z'$ the ratio of the speed transmission has been altered, shaft 2 runs now slower. Fig. 4 shows the position which the disk 5 assumes by moving shaft 1 and 2 in the opposite direction as mentioned above; the shaft 2 runs now faster as in the position shown in Fig. 1.

The shafts 1 and 2 may be adjusted, in axial direction by hand or by any other suitable means, or the shafts 1 and 2 may be acted upon by forces P and Q respectively, both acting in axial direction. The force P may be proportional to the driving force and may be brought in action by spring 15 acting on the sleeve 14, whilst the force Q corresponds to the load on shaft 2 which force acts through the screw 17. The disks 5 are automatically set in a position with reference to race 7 which corresponds to the relation or ratio of the forces P and Q and the point $z$ moves automatically inwards or outwards changing the ratio of speed transmission. Figs. 5 and 6 illustrate the action of a disk 5 at different positions. If point $z$ moves to the position $z'$ the radii $x$, $y$ on the size of which (with reference to each other) the ratio of speed transmission depends, change to the radii $x'$, $y'$. The variation of the speed of the driven wheel 4 is illustrated by the lines $v_1$, $v_2$ and $v_2'$. By a given circumferential speed $v_1$ of wheel 3 the speed of wheel 4 changes from $v_2$ to $v_2'$ if the radii $x$, $y$ change to $x'$, $y'$.

By turning ring 16 the end or initial position of slide 14 may be adjusted as desired and therewith the position of the disks 15. The pitch of the threads 13 may be chosen in such a manner that the sleeve 14 retains its position once given, the action of spring 15 being dispensed with. The disks 5 assume thereby a certain position in which they remain and a certain desired ratio of the transmission of speed remains unaltered.

Fig. 7 illustrates diagrammatically some parts of a speed transmission device working on the same principle in which the disks 5 run with their rims on the driving wheel 3 and on the stationary race 7 and with their faces on the driven wheel 4.

The device may be made as shown in Fig. 8 in which the disks 5 run with their rims on the stationary race 7 and the driven wheel 4 while the face of the disks 5 run on a race of the driving wheel 3.

The stationary race 7 on which the face of the disks 5 runs may be curved as shown in Fig. 9.

In Fig. 10 a device is shown in which the disks 5 are conical, the cone runs on a stationary curved race 7 while its rim touches the wheels 3 and 4.

The position of the driving element the driven element and the transmitting elements may be as shown in Fig. 11. On the outer curved face of a stationary race 7 rest the rotary disks 5, the rims of which run on the driving wheel 3 and the driven wheel 4. By moving the wheels 3, 4 with reference to the race 7 the ratio of speed transmission may be altered.

Fig. 12 shows a similar construction, it differs from that shown in Fig. 11 in that the stationary race 7 is flat while the face of the disk 5 running on race 7 and engaging the wheels 3, 4, is curved.

As shown in Fig. 13 a plurality of groups each consisting of two co-operating disks 5, 5' may be used to obtain a high difference in the speeds of the driven and the driving shaft. The disks 5, 5' run on a loosely mounted annular member 11 and on a common stationary race 7, moreover the disks 5 run on the driving wheel 3 and the disks 5' on the driven wheel 4. By moving the annular member 11 in axial direction the position of the disks 5, 5' on the race 7 is altered their active radii are changed simultaneously in such a manner that the resulting speed variations due to the disks 5 and 5' are added. According to the direction in which the member 11 is moved a high increase or decrease of speed of the driven wheel 4 is obtained.

Fig. 14 illustrates a construction similar to that shown in Fig. 13. The disks 5, 5' are placed apart and run on separate races 7. The races 7 are stationary, the wheels 3 are fastened to a driving shaft or wheel having the shape of a pulley over which a belt may run. By adjusting the wheels 3 in axial direction the disks 5, 5' are displaced and the ratio of speed transmission is altered accordingly.

In the device shown in Figs. 15 and 16 the disks 5 are provided with two curved faces and running between two annular members 3 and 20. The disk 5 is in frictional engagement with the stationary race 7 and the driven wheel 4. By moving either wheel 3 or ring 20 in axial direction the position of the disk 5 is changed. In the position of the disk 5 shown in Fig. 15 the wheels 3 and 4 are rotated in opposite directions. In the position shown in Fig. 16 the driving wheel 3 and the driven wheel 4 rotate in the same direction but at different speeds. If the disk 5 takes a radial position the rotation of the wheel 3 is not transmitted to wheel 4.

Instead of disks 5 balls 23 may be used as shown in a diagrammatical manner in Fig. 17 to transmit the motion of a driving shaft 1 to a driven shaft 2. A number of balls 23 run on the slanting faces of two races 24 mounted on shaft 1 in such a manner that they may be moved with reference to each other by means, not shown in the drawing. The balls 23 run moreover on the stationary race 7 and on the curved face of the wheel 4 fastened to the driven shaft 2.

Fig. 18 shows in a cross-section part of a device with conical rotary bodies 5 running with their rim in grooves of the driving wheel 3 and of the driven wheel 4. The cone 24' is pressed against a flange 25 of a stationary race 7.

In the device shown in Fig. 19 a rotary disk 5 runs between the driving wheel 3 and the driven wheel 4 the rim of disk 5 engages grooves in said wheels 3, 4. The face 26 of the disk 5 rests on the rim of a disk 7 which may be displaced but in axial direction. It is apparent that the ratio of speed transmission may be altered by displacing the race 7 and that the direction of the driven wheel 4 may be altered by passing said race 7 from one side over the center of the disk 5.

In Fig. 20 a further embodiment of my invention is shown in axial section, Fig. 21 is a cross-section on line 21—21.

On the driving shaft 31 the disk 33 is mounted on the periphery of which six discs 35 are running arranged in a circle at regular distances apart. Each disk 35 is provided with a central pin 36 by means of which it is journalled in a bearing 37 rotatably mounted on a pin 38. The pin 38 of each bearing 37 is fixed in radially disposed flanges 39 of a disk 40 having a central boss by means of which the disk 40 is rotatably mounted on the hub of disk 33. On the boss of disk 40 one end of a sleeve 42 runs on a bush 44 mounted on shaft 31. The bush 44 is movable in axial direction on the shaft 31, but it partakes of the rotations of shaft 31, a key on the latter engages a groove in the bush 44. On the outer surface of sleeve 44 screw threads are cut on which a nut 45 is screwed. By turning the nut 45 the sleeve 42, is moved in axial direction and therewith the bush 44. On the hub of disk 33 an annular member 46 is mounted and between this member 46 and a ball-bearing 48 a coiled spring 49 is arranged, and held under compression. The ball bearing 48 rests on a shoulder of sleeve 42. The adjacent faces of bush 44 and disk 33 run in helical lines and equidistant and between them are balls 50. On the sleeve 44 lugs 53 are arranged in which angular levers 52 are pivoted. The levers 52 are provided with rollers 55, 56 the rollers 55 abut on the wall 58 of the casing 63 and the rollers 56 on an annular member 57 having a race 59 on which the disks 35 run. The annular member 57 is movable in axial direction but is secured against rotation by well known means. By moving the nut 45 the annular member 57 is moved. The disks 35 run on a ringplate 60 which is fastened to a wheel 61, keyed on the driven shaft 62. Shaft 62 is rotatably mounted in the casing 63 by means of ball bearings.

In the position shown the disks 35 touch the ringplate 60 at their center, and the rotations of the driving shaft 31 are transmitted to the driven shaft 62 at a given ratio corresponding to the diameters of the parts 33, 35 and 59. As soon as the sleeve 44 is displaced in axial direction, the parts 33 and 57 are moved with the latter in opposite directions to each other. The disks 35 are moved and their axes of rotation are oblique to the axis of the shafts 31 and 62. The point in which each disk 35 touches the ringplate is now out of centre and the ratio of transmission is now changed. Owing to the helical form of the faces of the bush 44 and wheel 33 the latter is driven in any direction of shaft 31.

Figure 23:
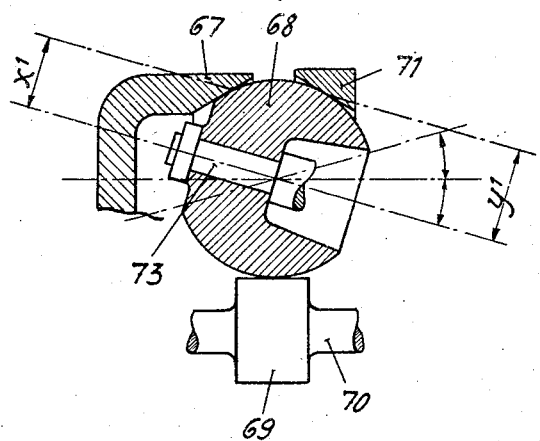
Fig. 23 shows a definite position of a roller element of this type as illustrated in Fig. 22 and it also shows parts cooperating with this element.

Figs. 22 and 23 show in a diagrammatical manner a further form. The driving shaft 66 rotates the wheel 67 which drives a number of ball shaped rotating bodies 68 arranged around the enlarged cylindrical portion 69 of the driven shaft 70. Each ball 68 runs on a stationary race 71 fixed to the casing 72 and moreover on a small shaft 73 which by means of a bell crank lever 74 may be tilted. The bell crank lever 74 is journalled at 75 to a sleeve 76 rotatably mounted on the driven shaft 70 and secured against axial displacement by a ring 77 and by the shoulder 69. One arm 82 of the bell crank lever 74 projects into an annular groove 81 of a sleeve 79 which may be displaced in axial direction by means of a hand wheel 80 the hub of which being screwed into the casing 72 and engaging the sleeve 79. As will appear from Fig. 23, the ratio of transmission of speed is varied according to the position of the axis of rotation of the bodies 68. In the position of the bodies 68 shown in Fig. 22 the ratio of speed transmission corresponds to the ratio of $x$ to $y$ in the position shown in Fig. 23 to the ratio $x'$ to $y'$. The operation is the same as described above, the balls 68 are rotated by the wheel 67 and they roll on the stationary race 71, the shaft 70 is driven by the balls 68 owing to the friction.

What we wish to secure by U. S. Letters Patent is:—

1. Friction gearing, comprising a driving member, a driven member and a non-rotary member, each provided with a rolling track, rolling elements, which are revolving between said three members and around the axis of the gearing, whereby the transmission of power is effected through rolling movement between said rolling elements and said three members, journals on said rolling elements, and a rotary element which does not participate in the transmission of power and in which the journals of the rolling elements are supported to prevent said rolling elements from rotating reversely or from tipping in a direction which does not coincide with the plane determined by the axis of the gearing and the axis of the respective rolling element or taking an undesired path.

2. Friction gearing, comprising a driving member, a driven member and a non-rotary member, each provided with a rolling track, means for imparting movement in direction of the axis to at least one of said three members, rolling elements which are revolving between said three members and around the axis of the gearing, whereby the transmission of power is effected through rolling movement between said rolling elements and said three members, and wherein one at least of the contacting rolling faces is curved in such manner, that upon displacement of the axially movable rolling track that engaging point of the roller element with the rolling track of said rotary member, which determines the transmission of movement, is moved to another position, journals on said rolling elements, and a rotary element which does not participate in the transmission of power and in which the journals of the rolling elements are supported to prevent said rolling elements from rotating reversely or from tipping in a direction which does not coincide with the plane determined by the axis of the gearing and the axis of the respective rolling element or taking an undesired path.

3. Friction gearing, comprising a driving member, a driven member and a non-rotary member, each provided with a rolling track, disc formed rolling elements with a slightly curved front surface, which are revolving between said three members and around the axis of the gearing, whereby the transmission of power is effected through rolling movement between said rolling elements and said three members, one of said three members which is contacting the curved faces of the rolling elements having a correspondingly formed rolling track, means for imparting movement in direction of the axis to at least one of said three members, for the purpose of making possible a displacement of the contact point between rolling elements and the aforesaid slightly curved roller track within the entire diameter of the rolling elements, journals on said rolling elements, and a rotary element which does not participate in the transmission of power and in which the journals of the rolling elements are supported to prevent said rolling elements from rotating reversely or from tipping in a direction which does not coincide with the plane determined by the axis of the gearing and the axis of the respective rolling element or taking an undesired path.

4. Friction gearing, comprising a driving member, a driven member and a non-rotary member, each provided with a rolling track, disc formed rolling elements with a slightly curved front surface, which are revolving between said three members and around the axis of the gearing, whereby the transmission of power is effected through rolling movement between said rolling elements and said three members, one of said three members which is contacting the curved faces of the rolling elements having a correspondingly formed rolling track, means for imparting movement in direction of the axis to at least one of said three members, and a rotary member which does not participate in the transmission of power for determining the proper position of the rolling elements, said rolling elements being supported in said last named rotary member in such manner, that they form two-armed levers in respect of the point of engagement with the flat rolling track, by means of which levers the axial pressure force acting on the edge of each rolling element produces simultaneously the necessary pressure forces for the other two points of contact.

5. Friction gearing, comprising a driving member, a driven member and a non-rotary member, each provided with a rolling track, the driving member and the driven member being each provided with a non-locking screw thread and being furthermore both axially movable, disc formed rolling elements with flat curved end faces, which are revolving between said three members and around the axis of the gearing, whereby the transmission of power is effected through rolling movement between said rolling elements and said three members, one of said three members which is contacting the curved faces of the rolling elements having a correspondingly formed rolling track, and a rotary element which does not participate in the transmission of power for the correct placement of the rolling elements, which are supported in said rotary element in such manner, as to form a double armed lever on the flat track with respect to their point of engagement, whereby the driving member and the driven member, owing to said non-locking screw thread are moved automatically in axial direction through the transmitted momentums so that the static momentums of the forces of axial sliding which are acting on the levers of the rolling elements counterbalance each other.

6. Friction gearing, comprising a driving member, a driven member and a non-rotary member, each provided with a rolling track, the driving member and the driven member being each provided with a non-locking screw thread and being furthermore both axially movable, a spring acting on said driving member with a force to move the same in axial direction in agreement with the torque, disc formed rolling elements with flat curved end faces, which are revolving between said three members and around the axis of the gearing, whereby the transmission of power is effected through rolling movement between said rolling elements and said three members, one of said three members which is contacting the curved faces of the rolling elements having a correspondingly formed rolling track, and a rotary element which does not participate in the transmission of power for the correct placement of the rolling elements, which are supported in said rotary element in such manner, as to form a double armed lever on the flat track with respect to their point of engagement, whereby the driving member and the driven member, owing to said non-locking screw thread are moved automatically in axial direction through the transmitted momentums so that the static momentums of the forces of axial sliding which are acting on the levers of the rolling elements counterbalance each other.

In witness whereof we affix our signatures.

JAKOB ARTER.
EDMUND SCHELLING.